United States Patent
Frelich et al.

(10) Patent No.: US 10,113,929 B2
(45) Date of Patent: Oct. 30, 2018

(54) USE OF WHEEL SLIP TO HELP IDENTIFY SOFT SPOTS

(71) Applicant: Caterpillar Paving Products Inc., Brooklyn Park, MN (US)

(72) Inventors: Thomas J. Frelich, Albertville, MN (US); Kyle David Hendricks, St. Francis, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 1104 days.

(21) Appl. No.: 14/465,571

(22) Filed: Aug. 21, 2014

(65) Prior Publication Data
US 2016/0054471 A1    Feb. 25, 2016

(51) Int. Cl.
| | |
|---|---|
| *G01L 11/00* | (2006.01) |
| *G01S 19/13* | (2010.01) |
| *G01S 19/14* | (2010.01) |
| *G01S 19/39* | (2010.01) |

(52) U.S. Cl.
CPC .............. *G01L 11/00* (2013.01); *G01S 19/13* (2013.01); *G01S 19/14* (2013.01); *G01S 19/39* (2013.01)

(58) Field of Classification Search
CPC ....... E01C 19/236; B50K 28/16; B60T 8/175; B60T 8/1706; B61L 27/0094; G01S 19/13; G01S 19/14; G01S 19/39
USPC ........................ 701/22, 25; 404/75; 303/9.64
See application file for complete search history.

(56) References Cited

U.S. PATENT DOCUMENTS

| | | |
|---|---|---|
| 3,913,680 A | 10/1975 | Carlson |
| 5,138,819 A | 8/1992 | Andre |
| 5,327,346 A | 6/1994 | Goodell |
| 8,725,360 B2 | 5/2014 | Uematsu et al. |
| 2007/0124332 A1* | 5/2007 | Ballesty .............. B61L 27/0094 |
| 2008/0063473 A1 | 3/2008 | Congdon et al. |
| 2009/0005985 A1* | 1/2009 | Basnayake ............. G01C 25/00 701/501 |
| 2010/0042298 A1 | 2/2010 | Haruyama et al. |
| 2010/0152942 A1* | 6/2010 | Stratton .................. B60T 8/175 701/25 |
| 2011/0273005 A1* | 11/2011 | Westerfeld ............ B60T 8/1706 303/9.64 |

(Continued)

FOREIGN PATENT DOCUMENTS

| | | |
|---|---|---|
| DE | 4242109 C2 | 12/1992 |
| JP | 2005247162 | 9/2005 |
| WO | 2013013915 A1 | 1/2013 |

OTHER PUBLICATIONS

Machine translation of JP 2005-247162, made of record by the applicant, published 2005.*

(Continued)

*Primary Examiner* — Regis Betsch
*Assistant Examiner* — Kaleria Knox
(74) *Attorney, Agent, or Firm* — Miller, Matthias & Hull

(57) ABSTRACT

A compactor gathers GPS, orientation and wheel slip data to identify the location of a soft spot in a surface that is being compacted and to isolate the soft spot to a particular side of the compactor if the wheel slip data indicates that the soft spot is located beneath only one of the compactor wheels. The GPS, orientation and wheel slip data are displayed as location information to an operator and/or sent to a remote location to facilitate the fast and accurate repair of the soft spot.

20 Claims, 4 Drawing Sheets

(56) References Cited

U.S. PATENT DOCUMENTS

| | | | |
|---|---|---|---|
| 2012/0107045 A1* | 5/2012 | DeClerk | E01C 19/236 404/75 |
| 2014/0025241 A1* | 1/2014 | Andou | B60K 28/16 701/22 |
| 2014/0045001 A1 | 2/2014 | Bassett | |
| 2014/0048001 A1 | 2/2014 | Bassett | |

OTHER PUBLICATIONS

Rinehart, R.V.; Mooney, M. A.; Faceas, N.F. and Musimbi, O. on Continious Compaction Control; "Examination of Roller-Integrated Continous Compaction Control on a ColoradoTestsite" TRB 2012 Annual Meeting, pp. 1-13.*

* cited by examiner

USE OF WHEEL SLIP TO HELP IDENTIFY SOFT SPOTS

TECHNICAL FIELD

This disclosure relates to compaction machines or compactors. More particularly, this disclosure relates to the identification and mapping of soft spots in the surface or material being compacted by compactors.

BACKGROUND

Compactors are used for compacting various surfaces and materials associated with roads, landfills and construction sites. For example, road builders use compactors to compact asphalt, soil, gravel and other materials during road construction and repair. Thorough compaction of the underlying ground and each layer of a road provides the requisite structural stability for the road. Landfill operators use compactors to maximize the use of a landfill by compacting trash to create space for additional trash. Compacting the trash in a landfill also helps to increase the structural stability of the landfill.

One type of compactor is a drum-type compactor having a heavy rotating drum for compacting or crushing the material over which the compactor is driven. In addition to the drum, such compactors may include two rear wheels and a frame. The weight of the compactor may provide the necessary weight and force for compaction. Additionally, the total weight of a compactor may be controlled by adding ballast, such as steel, concrete, calcium chloride, sand and/or water.

Drum-type compactors may have a vibratory mechanism that includes movable weights arranged within the drum. Shifting the positions of the weights inside the drum induces vibrational forces that are imparted to the surface, aiding compaction. The amplitude and frequency of the vibrations may be controlled to increase the degree of compaction. Accelerometer-based measurement systems may sense the vibrational return and provide the operator with an indication of what conditions exist at or beneath the surface being compacted. Alternatively, soil conditions and stiffness can be measured using rolling resistance data from the drum and/or the wheels.

Despite the use of a compactor, soft spots may occur in a surface that is being compacted. Soft spots may create safety hazards, reduce vehicle traction or preclude a stable foundation with a known and uniform density. Such soft spots are known to occur during road construction, landfill compaction or in almost any surface that is being compacted. As soft spots may not be visible to an operator of a compactor or other member of the crew, identifying and recording the location of soft spots is necessary for their timely and fast repair. These repairs may be accomplished by various means, including adding material to the soft spot, removing the soft material and replacing it with denser material, making additional passes over the soft spot with the compactor and/or digging up a foreign object that may be buried under the surface.

However, because soft spots may not be clearly visible, precisely locating a soft spot that has been traversed by a compactor remains problematic because there is no convenient means for recording the precise location of a soft spot or transmitting the precise location of a soft spot to a repair crew. U.S. Pat. No. 8,073,609 (Koch) discloses a system for sensing slippage of a truck or vehicle travelling on a road or path and recording the location of the slippage on a map. The system of Koch uses the recorded location by adjusting a speed and/or steering angle of a truck subsequently travelling through the recorded location in response to an anticipated or actual slip.

There is a need for an improved compactor capable of more accurately identifying and recording the location of soft spots so soft spots can be quickly and properly repaired.

SUMMARY OF THE DISCLOSURE

In one aspect, a system is disclosed for identifying and mapping soft spots traversed by a vehicle. The vehicle may include a first wheel and a second wheel and the first and second wheels may be disposed on opposite sides of the vehicle. The system may include a first slip sensor for detecting the rotational speed of the first wheel. The first slip sensor may be linked to a mapping system for transmitting first wheel rotational speed data to the mapping system. The system may further include a GPS sensor for generating GPS data. The GPS sensor may be linked to the mapping system for transmitting the GPS data to the mapping system. Further, the mapping system may be configured to identify the location of the first wheel slip based on the first wheel rotational speed data and the GPS data.

In another aspect, a compactor is disclosed. The compactor may include a first side including a first wheel and a second side including a second wheel. The compactor may further include a first slip sensor for detecting the rotational speed of the first wheel and a second slip sensor for detecting the rotational speed of the second wheel. The first and second wheel slip sensors may be linked to a mapping system for transmitting the first and second wheel rotational speed data to the mapping system. The compactor may further include a GPS sensor for gathering GPS data. The GPS sensor may be linked to the mapping system for transmitting GPS data to the mapping system. The mapping system may be configured to identify a location and a compactor side of a soft spot based on the first wheel rotational speed data, the second wheel rotational speed data and the GPS data.

In another aspect, a method is disclosed for using wheel slip of a compactor to identify and locate soft spots. The disclosed method may include providing a compactor with a first side including a first wheel and a second side including a second wheel. The method may further include detecting a rotational speed of the first wheel and generating first wheel rotational speed data. The method may further include detecting a rotational speed of the second wheel and generating second wheel rotational speed data. The method may further include collecting GPS data for the compactor. The method may further include determining if the first wheel slips based on the first wheel rotational speed data exceeding a predetermined value and, if the first wheel slips, determining a first location along the first side of the compactor where the first wheel slips based on the GPS data. The method may further include determining if the second wheel slips based on the second wheel rotational speed data exceeding a predetermined value and, if the second wheel slips, determining a second location along the second side of the compactor where the second wheel slips based on the GPS data. The method may further include identifying a soft spot location that may encompass the first location, the second location or both the first and second locations. Finally, the method may include recording the soft spot location.

DETAILED DESCRIPTION

Figure 1:
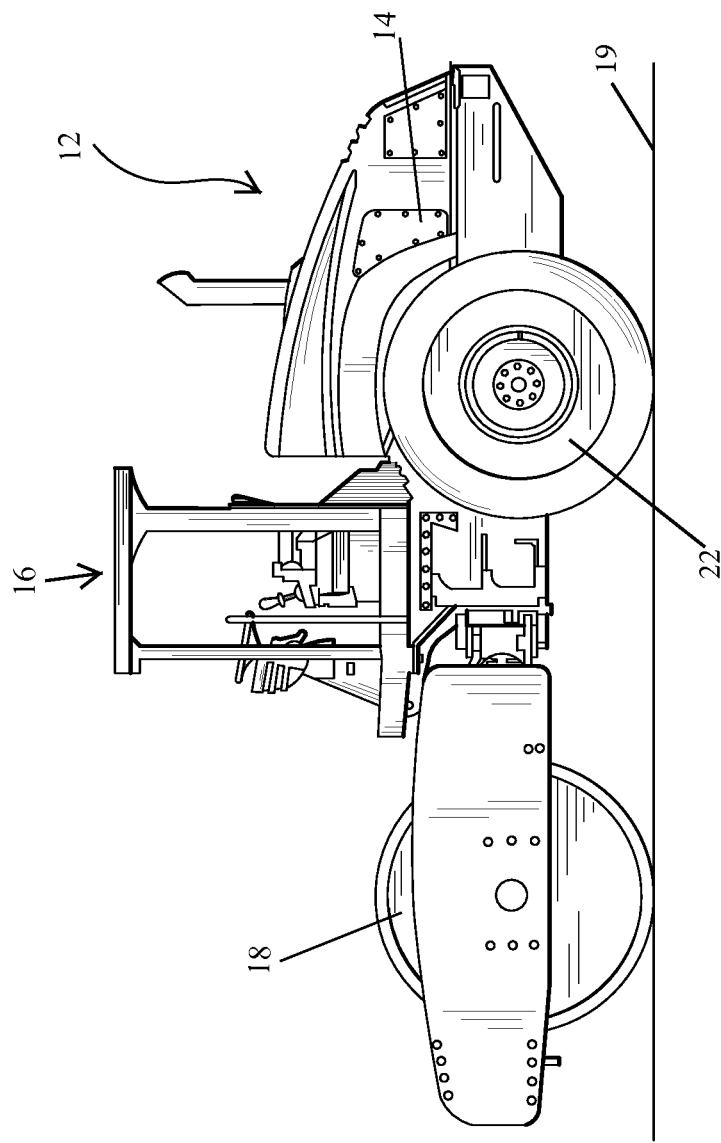
FIG. 1 is a side view of a compactor.
Figure 2:
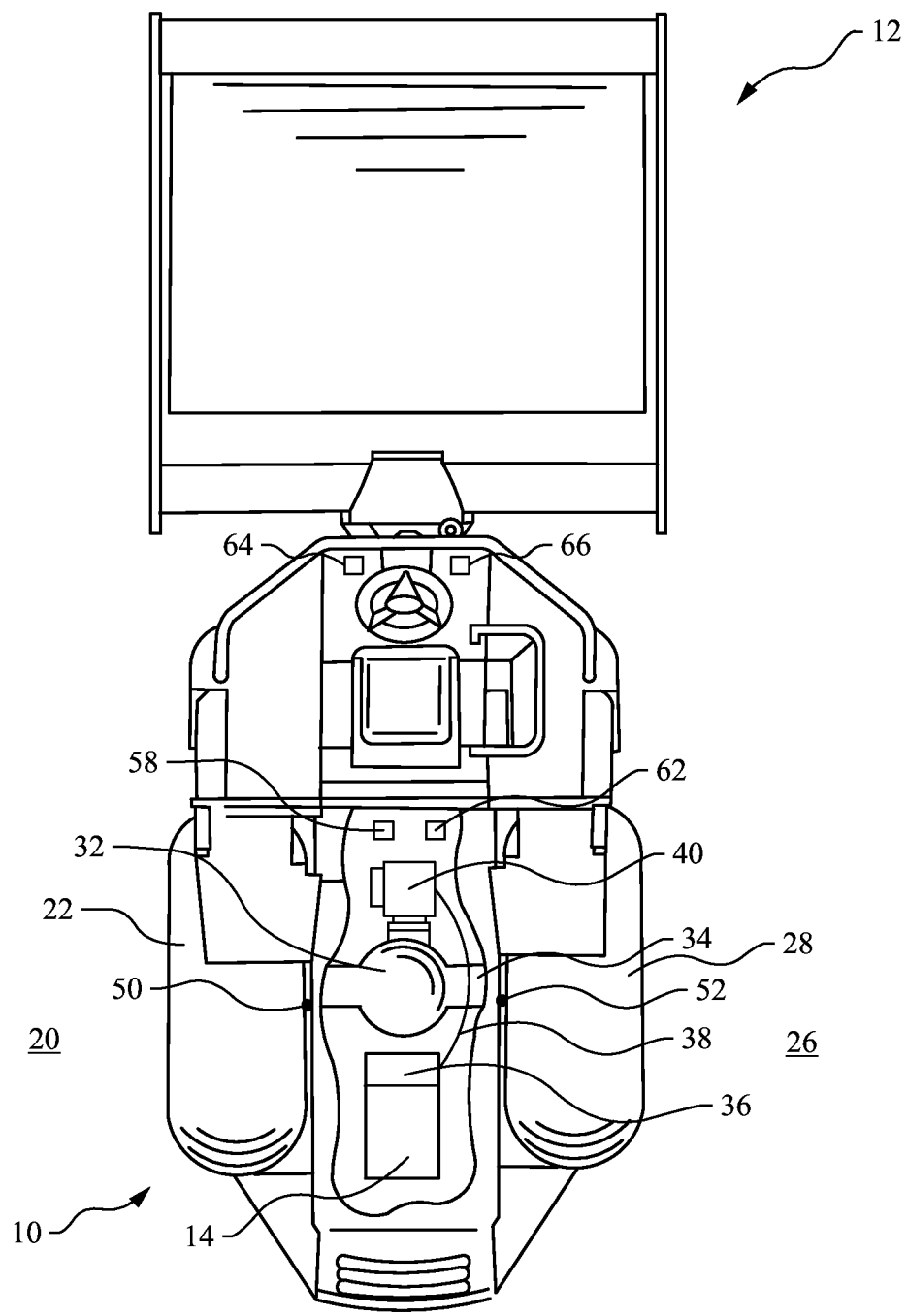
FIG. 2 is a top view of a compactor with portions removed to show interior details.

FIG. 1 illustrates a compactor 12, which may include an engine 14, a cab 16 and a drum 18. In an exemplary embodiment, compactor 12 is a soil compactor. In alternative embodiments, compactor 12 may be any other compactor having wheels, such as a landfill compactor. The drum 18 is located forward of the cab 16 and rotates as the compactor 12 rolls over a surface 19. The cab 16 may include various controls for an operator. As shown in FIG. 2, the compactor 12 may also include a first side 20 with a first wheel 22 and a second side 26 with a second wheel 28.

As further shown in FIG. 2, the compactor 12 may include a differential 32 coupled to an axle 34, which may distribute power to one or both wheels 22, 28 from the differential 32. The engine 14 may power a hydraulic pump 36 that drives a primary hydraulic motor 40 for transmitting hydraulic power to the differential 32 and one or both of the wheels 22, 28. The engine 14 may also provide power to the differential 32 through mechanical means.

Figure 3:
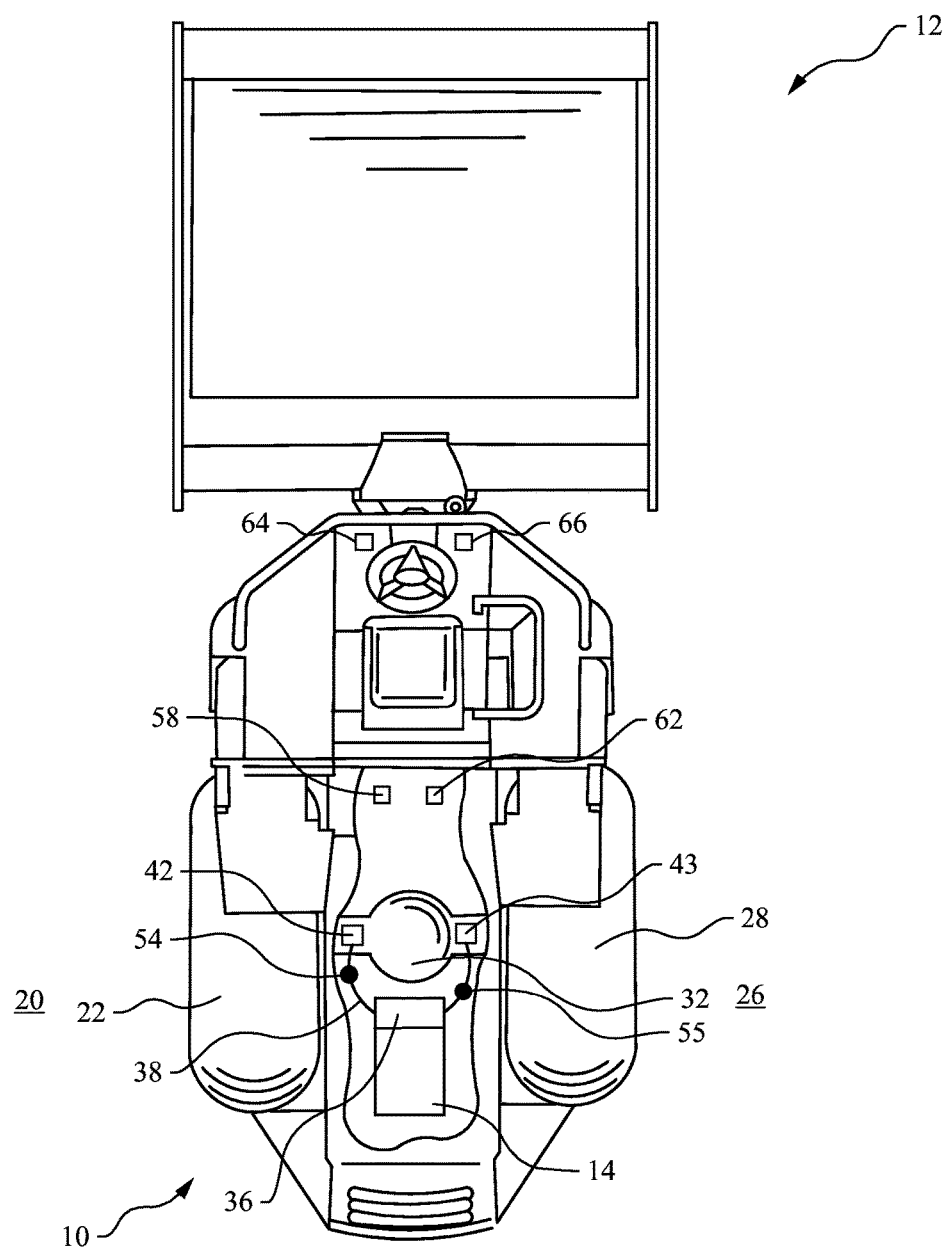
FIG. 3 is a top view of another compactor with portions removed to show interior details of an alternate embodiment from FIG. 2.

Additionally, the compactor 12 may include a secondary hydraulic motor 42 and a tertiary hydraulic motor 43 that may be powered by a hydraulic pump 36, as shown in FIG. 3. The secondary and tertiary hydraulic motors 42, 43 may each power one of the wheels 22, 28 independent of each other. Thus, engine 14 may power one or both of the wheels 22, 28 and the drum 18 mechanically or hydraulically and this disclosure is applicable to both types of drive systems.

As the compactor 12 rolls, its mass, along with the shape of the drum 18, compacts the surface 19 over which the compactor 12 traverses. However, as the compactor 12 travels over the surface 19, the wheels 22, 28 may slip due to a lack of traction caused by a soft spot. The power delivered to the wheels 22, 28 by the engine 14 may exceed the capacity of one or both of the wheels 22, 28 to transfer power to the surface 19 without slipping because of the lower ground density of a soft spot in the surface 19. For example, one wheel 22 may travel over a soft spot in the surface 19 while receiving power from the engine 14 and the other wheel 28 may travel over a dense area of the surface 19 while receiving power from the engine 14. In this situation, the first wheel 22 may lose traction and slip while the second wheel 28 may transmit the power it receives to the surface 19 without slipping. In this example, detecting that the wheel 22 slips while detecting no slippage from the other wheel 28 may be used by a system 10 to isolate a soft spot to the first side 20 of the compactor 12 as opposed to both sides 20, 26 of the compactor 12. Identifying and recording the location of soft spots allows for the quick repair of a soft spot. As soft spots may not be visible, locating a soft spot as precisely as possible allows repair work to proceed more quickly and accurately without having to search for the soft spot, saving time and expense.

The system 10 may include a first slip sensor 50 to detect slippage of the first wheel 22 and a second slip sensor 52 to detect slippage of the second wheel 28. The slip sensors 50, 52 may be speed sensors located near each wheel 22, 28, along the axle 34 or at various points along the powertrain, as shown schematically in FIG. 2. The slip sensors 50, 52 may mechanically or electrically detect rotation and sudden changes in the rotational velocity of the wheels 22, 28, and accordingly measure for slip. Alternatively, the system 10 and compactor 12 may include one or more pressure sensors 54, 55 in communication with a hydraulic circuit 38 that includes at least the hydraulic pump 36 and the secondary and tertiary hydraulic motors 42, 43 (FIG. 3). The pressure sensor 54 may sense a pressure at a point along the hydraulic circuit 38 between the hydraulic pump 36 and the secondary hydraulic motor 42 or between the secondary hydraulic motor 42 and the first wheel 22. Similarly, the pressure sensor 55 may sense a pressure at a point along the hydraulic circuit 38 between the hydraulic pump 36 and the tertiary hydraulic motor 43 or between the tertiary hydraulic motor 43 and the second wheel 28. Drops in the pressures measured by the pressure sensors 54, 55 can be indications of slippage at either of the wheels 22, 28. The pressure sensors 54, 55 may function as to determine slip at each wheel 22, 28 independently by measuring the pressures at points within the hydraulic circuit 38 or at the secondary and tertiary hydraulic motors 42, 43.

Figure 4:
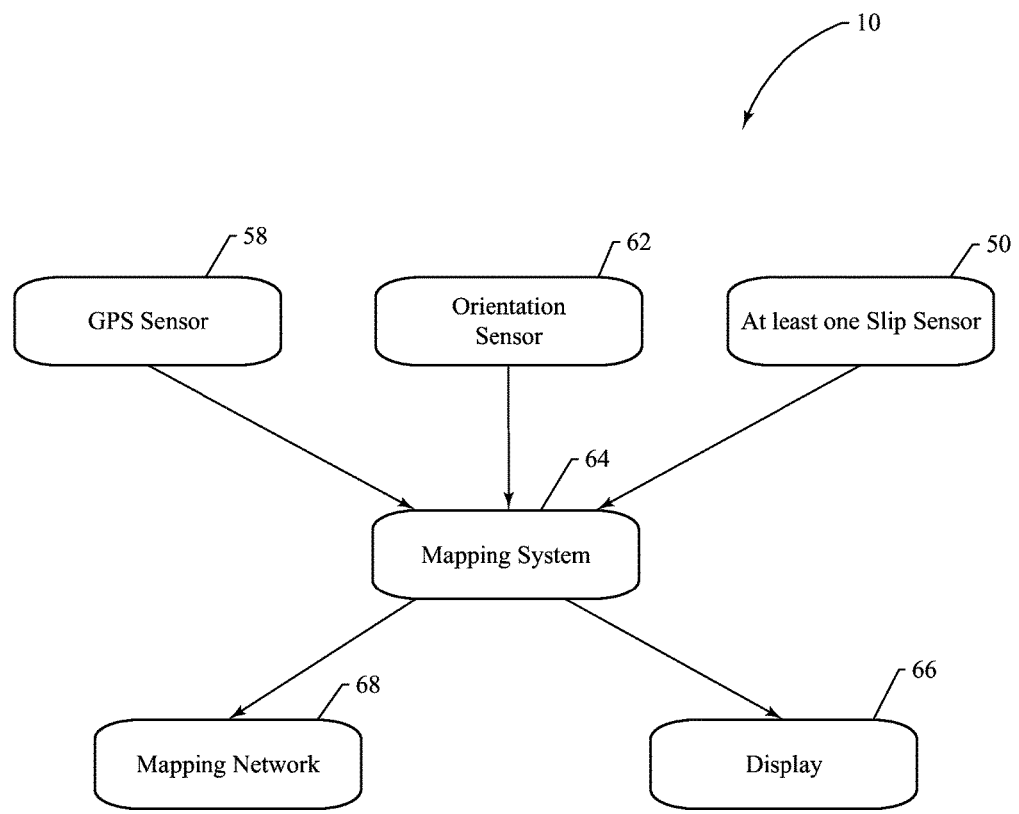
FIG. 4 is a schematic map depicting elements which may be included in an embodiment of the present disclosure.

Thus, the system 10 employs the first and second slip sensors 50, 52 (and/or pressure sensors 54, 55) to detect or recognize slip in each of the wheels 22, 28. Slip, in the form of rotational speed of either wheel 22, 28 above a certain predetermined or threshold value, may be indicative of a soft spot in the surface 19. The threshold value may be established by measuring and analyzing a variety of factors. These factors may include type, pressure and condition of the tires (not shown) mounted on the wheels 22, 28, the weight of the compactor 12, soil conditions and/or conditions of the surface 19. These factors may also include environmental elements, such as temperature, pressure and humidity. Alternatively, the slip sensors 50, 52 may measure varying degrees of wheel slip independent of a threshold value. The slip sensors 50, 52 or pressure sensors 54, 55 may transmit the rotational speed data to the mapping system 64 as shown in FIG. 4.

As shown in FIGS. 2 and 3, the system 10 may also include a GPS sensor 58, an orientation sensor 62, a mapping system 64 and a display 66. As shown in FIG. 4, the mapping system 64 may be linked to the GPS sensor 58 for receiving GPS data and the mapping system 64 may also be linked to the orientation sensor 62 for receiving orientation data. Further, the mapping system 64 may be linked to the slip sensors 50, 52 for receiving rotational velocity data or slip data from slip sensors 50, 52 for each wheel 22, 28. If pressure sensors 54, 55 are used, the mapping system 64 may be linked to the pressure sensors 54, 55 for receiving pressure data indicative of the traction or slippage experienced at the wheels 22, 28. The system 10 may also communicate with a mapping network 68 for purposes of transmitting data indicative of a soft spot to a remote location or to another compactor or machine.

The orientation sensor 62 may be located on the compactor 12 for detecting the directional orientation of the compactor 12 relative to a stationary ground reference and transmitting orientation data to the mapping system 64. The orientation sensor 62 may employ magnetic components for generating orientation data for delivery to the mapping system 64. This orientation data can be combined with wheel rotational speed data from the slip sensors 50, 52 or pressure data from the pressure sensors 54, 55 and GPS data from the GPS sensor 58 to determine the precise location of a soft spot under one or both of the wheels 22, 28. Using this technique, the position, orientation and wheel slip data can be combined to isolate the soft spot to a first side 20 or second side 26 of the compactor 12. The GPS sensor 58 may gather GPS data and either the mapping system 64 and/or the GPS sensor 58 may determine the global location of the compactor 12 continuously during the operation of the compactor 12. This continuous locational data may also be used to determine the orientation of the compactor 12.

If the mapping system 64 has isolated the soft spot to a particular location and side of the compactor 12, this information may be sent from the mapping system 64 to a display 66. The display 66 may be mounted in the cab 16 and may be visible to an operator. The information can be displayed visually, in conjunction with locational images, in conjunction with moving images or overlaid on a map. Accessibility to this information may allow an operator to quickly identify or avoid soft spots. Transmission of this information to the mapping network 68 (FIG. 4) may allow a contractor or supervisor to institute a soft spot repair procedure in a timely manner.

The mapping network 68 may include information from other displays, information for other vehicles or compactors, centralized information hubs and means for informational communication therebetween. The mapping network 68 could allow other vehicles or compactors to avoid a soft spot or communicate a soft spot location to repair crews. The mapping network 68 may also allow storage of the information away from the mapping system 64 for redundancy and security. The information could also be sent to a centralized information hub to convey the ground condition of a particular site.

A method of using wheel slip to help identify and locate soft spots is also disclosed. The method may include providing a compactor 12, wherein the compactor may have a first side 20 including a first wheel 22 and a second side 26 including a second wheel 28. The method may further include detecting a rotational speed of the first wheel 22 and generating first wheel rotational speed data and detecting a rotational speed of the second wheel 28 and generating second wheel rotational speed data. The method may further include collecting GPS data for the compactor 12. The method may further include determining if the first wheel 22 slips based on the first wheel rotational speed data exceeding a predetermined value and, if the first wheel 22 slips, determining a first location where the first wheel 22 slips based on the GPS data. The method may further include determining if the second wheel 28 slips based on the second wheel rotational speed data exceeding a predetermined value and, if the second wheel 28 slips, determining a second location where the second wheel 22 slips based on the GPS data. The method may further include identifying a soft spot location and on which side or sides of the compactor 12 the soft spot is located based on if the first 22 and/or second wheel 28 slips and where the first 22 and/or second wheel 28 slips. The method may also include recording the location of the soft spot.

The disclosed method may also include enabling the mapping system 64 to send the information to a mapping network 68 including other displays, other vehicles or compactors and remote locations, and determining a threshold value to correspond to the slip a wheel 22, 28 would experience while traveling over a soft spot.

INDUSTRIAL APPLICABILITY

When a compactor 12 traverses a soft spot in a surface 19, a rear wheel 22, 28 may traverse the soft spot, while the other rear wheel does not. As a result, the rear wheel that traverses the soft spot will experience lower traction than the opposite wheel traveling over a properly compacted area, causing the wheel traversing the soft spot to slip. Monitoring and recording which individual wheel slips while traveling over a soft spot can help isolate the soft spot to a particular side of the compactor 12. If both wheels 22, 28 slip, the soft spot is determined to extend across both sides of the compactor 12.

To alleviate this problem, a system 10 and the compactor 12 include slip sensors 50, 52 and/or pressure sensors 54, 55 associated with each wheel 22, 28 along with a GPS sensor 58 and a mapping system 64. The system 10 and compactor 12 may include an orientation sensor 62. The mapping system 64 may use wheel slip data from the slip sensors 50, 52 and/or pressure sensors 54, 55, compactor 12 orientation data from the orientation sensor 62, and GPS data from the GPS sensor 58 to determine a precise location of a soft spot under one or both wheels 22, 28. Using this technique, compactor position, directional orientation and wheel slip data may be combined to isolate the soft spot to a first side 20 or a second side 26 of the compactor 12. The precise location of a soft spot may be transmitted over a mapping network 68, which may be used by a contractor or supervisor to dispatch equipment or personnel to repair the soft spot in a timely fashion. Identifying and recording the location of soft spots allows for their quick repair because workers no longer have to search for soft spots, thereby saving costs and time. The disclosed system 10 may be original equipment on new compactors 12 or added as a retrofit to existing compactors 12.

The invention claimed is:

1. A system for identifying and mapping soft spots traversed by a vehicle, the vehicle including a first wheel and a second wheel, the first and second wheels disposed on opposite sides of the vehicle, the system comprising:
   a first slip sensor for detecting a rotational speed of the first wheel and generating first wheel rotational speed data, the first slip sensor linked to a mapping system for transmitting the first wheel rotational speed data to the mapping system;
   a GPS sensor for detecting and generating GPS data, the GPS sensor linked to the mapping system for transmitting the GPS data to the mapping system; and
   the mapping system configured to identify a location of a first wheel slip based on the first wheel rotational speed data and the GPS data to provide location information for the soft spot;
   wherein the location information is utilized by the mapping system to direct repair of the soft spot.

2. The system of claim 1, wherein the first slip sensor is a speed sensor.

3. The system of claim 1, wherein the first slip sensor is a pressure sensor in fluid communication with a hydraulic circuit of the vehicle that powers the first wheel of the vehicle.

4. The system of claim 1, further including an orientation sensor for detecting a directional orientation of the vehicle and generating vehicle orientation data, and
   wherein the mapping system is linked to the orientation sensor for receiving the vehicle orientation data from the orientation sensor and determining vehicle orientation in addition to the location of the first wheel slip.

5. The system of claim 1, wherein the mapping system is linked to a mapping network for transmitting the location of the first wheel slip to a remote location.

6. The system of claim 1, further including a second slip sensor for detecting a rotational speed of the second wheel and generating second wheel rotational speed data, the second slip sensor linked to the mapping system for transmitting the second wheel rotational speed data to the mapping system, and the mapping system identifying the location and a vehicle side of a soft spot based on the first and second wheel rotational speed data and the GPS data.

7. The system of claim 6, wherein the second slip sensor is a speed sensor.

8. The system of claim 6, wherein the second slip sensor is a pressure sensor in fluid communication with a hydraulic circuit of the vehicle that powers the second wheel of the vehicle.

9. The system of claim 1, further including an orientation sensor for detecting a directional orientation of the vehicle and generating vehicle orientation data, a second slip sensor for detecting the rotational velocity of the second wheel and generating second wheel rotational speed data, the second slip sensor linked to the mapping system for transmitting the second wheel rotational speed data to the mapping system, and the mapping system linked to the orientation sensor for receiving vehicle orientation data from the orientation sensor, and the mapping system identifying the location and a vehicle side of a soft spot based on the first and second wheel rotational speed data and the GPS data, and the mapping system determining vehicle orientation in addition to the location and the side of the soft spot.

10. A compactor comprising:

a first side including a first wheel and a second side including a second wheel;

a first slip sensor for detecting the rotational speed of the first wheel and generating first wheel rotational speed data;

a second slip sensor for detecting the rotational speed of the second wheel and generating second wheel rotational speed data;

the first and second wheel slip sensors linked to a mapping system for transmitting the first and second wheel rotational speed data to the mapping system respectively;

a GPS sensor for gathering GPS data, the GPS sensor linked to the mapping system for transmitting GPS data to the mapping system; and the mapping system configured to identify a location and a compactor side of a soft spot based on the first wheel rotational speed data, the second wheel rotational speed data and the GPS data to provide location information for the soft spot;

wherein the location information is utilized by the mapping system to direct repair of the soft spot.

11. The compactor of claim 10, wherein the first and second wheel slip sensors are speed sensors.

12. The compactor of claim 10, wherein the compactor further includes a hydraulic circuit for powering the first and second wheels, and the first and second wheel slip sensors are pressure sensors linked to the hydraulic circuit.

13. The compactor of claim 10, further including an orientation sensor for detecting a directional orientation of the compactor and generating compactor orientation data, the mapping system being linked to the orientation sensor for receiving compactor orientation data from the orientation sensor.

14. The compactor of claim 13, wherein the mapping system combines the first wheel rotational speed data, the second wheel rotational speed data, the GPS data and the compactor orientation data and generates the location, compactor side and compactor orientation of the soft spot therefrom.

15. The compactor of claim 14, wherein the mapping system records the location, compactor orientation and compactor side of the soft spot and displays the location, compactor orientation and compactor side to an operator.

16. The compactor of claim 10, wherein the mapping system is linked to a mapping network for transmitting the location of the soft spot.

17. A method of using wheel slip of a compactor to identify and locate soft spots comprising:

providing a compactor, the compactor having a first side including a first wheel and a second side including a second wheel;

detecting a rotational speed of the first wheel and generating first wheel rotational speed data;

detecting a rotational speed of the second wheel and generating second wheel rotational speed data;

collecting GPS data for the compactor;

determining if the first wheel slips based on the first wheel rotational speed data exceeding a predetermined value and, if the first wheel slips, identifying a first location where the first wheel slips based on the GPS data;

determining if the second wheel slips based on the second wheel rotational speed data exceeding a predetermined value and, if the second wheel slips, identifying a second location where the second wheel slips based on the GPS data;

identifying a soft spot location based on if a first location, a second location or both a first and second location have been identified; and recording the soft spot location to provide location information;

wherein the location information is utilized to direct repair of the soft spot.

18. The method of claim 17, further including sending the location of the soft spot to a mapping network.

19. The method of claim 18, wherein the first and second wheels are driven by a hydraulic circuit and the rotational speed of the first wheel is detected based on an input pressure to the first wheel and the rotational speed of the second wheel is detected based on an input pressure to the second wheel.

20. The method of claim 17, further determining a directional orientation of the compactor and generating compactor orientation data indicative of the directional orientation of the compactor at the soft spot location.

* * * * *